(12) United States Patent
Rehn

(10) Patent No.: US 8,279,514 B2
(45) Date of Patent: Oct. 2, 2012

(54) OPTOELECTRONIC DEVICE

(75) Inventor: Henning Rehn, Berlin (DE)

(73) Assignee: Osram AG, Munich (DE)

( * ) Notice: Subject to any disclaimer, the term of this patent is extended or adjusted under 35 U.S.C. 154(b) by 342 days.

(21) Appl. No.: 12/524,109

(22) PCT Filed: Jan. 24, 2007

(86) PCT No.: PCT/DE2007/000127
§ 371 (c)(1),
(2), (4) Date: Dec. 14, 2009

(87) PCT Pub. No.: WO2008/089712
PCT Pub. Date: Jul. 31, 2008

(65) Prior Publication Data
US 2010/0103497 A1     Apr. 29, 2010

(51) Int. Cl.
*G02B 26/00* (2006.01)
(52) U.S. Cl. .................. 359/290; 359/291; 359/292
(58) Field of Classification Search .......... 359/290–292, 359/298, 237
See application file for complete search history.

(56) References Cited

U.S. PATENT DOCUMENTS

| 4,035,065 | A | 7/1977 | Fletcher et al. |
| 5,343,489 | A | 8/1994 | Wangler |
| 5,828,424 | A | 10/1998 | Wallenstein |
| 6,317,170 | B1 | 11/2001 | Hwang et al. |
| 6,323,984 | B1 | 11/2001 | Trisnadi |
| 6,367,935 | B1 | 4/2002 | Wang et al. |
| 6,577,429 | B1 * | 6/2003 | Kurtz et al. ............ 359/279 |
| 6,693,930 | B1 | 2/2004 | Chuang et al. |
| 6,898,216 | B1 | 5/2005 | Kleinschmidt |
| 2001/0022566 | A1 | 9/2001 | Okazaki |
| 2002/0027716 | A1 | 3/2002 | Tanaka |
| 2004/0136665 | A1 | 7/2004 | Furman et al. |
| 2005/0234348 | A1 | 10/2005 | Watanabe |
| 2006/0125969 | A1 | 6/2006 | Chilla et al. |
| 2006/0146896 | A1 | 7/2006 | Park |
| 2007/0116405 | A1 * | 5/2007 | Kane et al. ............ 385/18 |
| 2007/0182964 | A1 * | 8/2007 | Den Boef et al. ........ 356/369 |

FOREIGN PATENT DOCUMENTS

| DE | 41 24 311 | 1/1993 |
| DE | 2 155 653 | 5/1993 |
| DE | 44 32 029 | 8/1997 |
| DE | 198 19 474 | 1/2004 |
| DE | 103 22 806 | 3/2007 |
| EP | 1 521 110 | 4/2005 |
| JP | 5-173094 | 7/1993 |
| JP | 2000-206449 | 7/2000 |
| JP | 2001-60550 | 3/2001 |
| JP | 2001-509911 | 7/2001 |

(Continued)

*Primary Examiner* — Thomas K Pham
*Assistant Examiner* — Brandi Thomas
(74) *Attorney, Agent, or Firm* — Cozen O'Connor

(57) ABSTRACT

An optoelectronic device for projecting a first beam (110) of coherent first electromagnetic radiation onto a surface (91) comprises a first radiation source (11), which is suitable for emitting a first beam (110) of coherent first electromagnetic radiation when in operation. The optoelectronic device additionally comprises a first phase-modifying element (21) in the beam path of the first electromagnetic radiation for changing the phase of the first electromagnetic radiation in a subzone (1102) of the first beam (110) and a radiation-directing element (4) in the beam path of the first electromagnetic radiation for changing a beam direction (P1, P2) of the first beam (110).

23 Claims, 6 Drawing Sheets

FOREIGN PATENT DOCUMENTS

| | | |
|---|---|---|
| JP | 2001-264662 | 9/2001 |
| JP | 2002-190454 | 7/2002 |
| JP | 2002-296514 | 10/2002 |
| JP | 2004-529375 | 9/2004 |
| WO | WO 03/001281 | 1/2003 |
| WO | WO 03/029875 | 4/2003 |
| WO | WO 2004/084534 | 9/2004 |
| WO | WO 2005/069058 | 7/2005 |
| WO | WO 2006/104704 | 5/2006 |
| WO | WO 2006/104704 | 10/2006 |
| WO | WO 2007/072359 | 6/2007 |

* cited by examiner

OPTOELECTRONIC DEVICE

RELATED APPLICATIONS

This is a U.S. national stage of application No. PCT/DE2007/000127, filed on Jan. 24, 2007.

FIELD OF THE INVENTION

The present invention relates to an optoelectronic device for projecting a beam of coherent electromagnetic radiation onto a surface.

BACKGROUND OF THE INVENTION

When observing a surface illuminated by coherent light or by the projection of coherent light onto the surface, an illumination pattern which appears irregularly bright in the form of a "speckle pattern" may be perceived in the far field of the reflected light. The speckle pattern may arise during imaging of the illuminated surface for example onto the retina of the eye or onto a spatially resolving detector system through interference effects of the light reflected at surface structures of the surface. Typical surface structures are usually the result of surface roughness. In the event of continuous modification of the illuminated area of the surface or of the eye or detector position, the continuously changing speckle pattern may be perceived in a mostly undesired manner as flickering.

SUMMARY OF THE INVENTION

At least one object of specific embodiments of the present invention is to provide an optoelectronic device with a coherent radiation source which is capable of reducing the impression of a speckle pattern.

An optoelectronic device according to at least one embodiment comprises a first radiation source, which is suitable for emitting a first beam of coherent first electromagnetic radiation when in operation, a first phase-modifying element in the beam path of the first electromagnetic radiation for modifying the phase of the first electromagnetic radiation in a subzone of the first beam and a radiation-directing element in the beam path of the first electromagnetic radiation for modifying the beam direction of the first beam.

In particular, modification of the phase in a subzone of the first beam may mean modification of the phase in a first subzone relative to a phase in a second subzone of the first beam. It could also be taken to mean in particular modification of a phase difference of the phases of two subzones.

The first beam of coherent first electromagnetic radiation may in particular be a pencil of rays of first electromagnetic radiation or a ray of first electromagnetic radiation. In particular, a beam of electromagnetic radiation may denote electromagnetic radiation of the type which may propagate preferably along any desired or a specific propagation direction, the beam path or the beam direction, and particularly preferably may be spatially limited transversely of the beam path.

Furthermore, the optoelectronic device may be suited to directing the first beam over a surface. The surface may for instance be a projection screen.

The action of the first phase-modifying element may be such that the phase of the first electromagnetic radiation is modified at least partially, i.e. in a first subzone or in a plurality of subzones, in such a way that a "rough" phase front may be produced. This may mean in particular that, although the first electromagnetic radiation is still coherent downstream of the first phase-modifying element, it no longer has a smooth phase front.

Since the surface which may be illuminated by the optoelectronic device or onto which the first beam is projected typically displays roughness, an observer conventionally gains the impression of a speckle pattern upon illumination of this surface by means of coherent electromagnetic radiation with a smooth phase front. This speckle pattern is an interference image, which is brought about by reflection of the coherent electromagnetic radiation at the individual subzones of the rough surface. The impression of a speckle pattern is also created when a beam of such coherent electromagnetic radiation with a smooth phase front is moved over the surface, since the phase of the electromagnetic radiation remains the same in a given subzone of the surface providing this subzone lies within the beam, i.e. is covered by the beam.

The impression of such a speckle pattern may advantageously be reduced or prevented by means of the rough phase front, produced by the optoelectronic device according to the invention, of the first electromagnetic radiation. This may be achieved in that, even upon minimal movement of the first beam over the surface, the interference image produced in an observer changes continually, since the phase of the electromagnetic radiation which impinges on the surface in a fixed subzone changes continually due to the "rough" phase front. Due to convolution, i.e. superposition of the rough phase front on the roughness of the surface, a changing interference image or speckle pattern may be continually produced. As a result of the continual modification of the interference image produced in an observer, the effect of time averaging of the interference image or of the speckle pattern arises due to persistence of vision. The time averaging produced by the eye may thus advantageously have the effect of reducing or even preventing the impression of a speckle pattern.

In a preferred embodiment, the first phase-modifying element is suitable for changing the phase of one part of the first beam relative to another part of the first beam. To this end, it may be advantageous for the first phase-modifying element to comprise a first zone and a second zone, which are in each case provided and/or suitable for modifying the phase of the first electromagnetic radiation in each case to a different degree. In particular, the first phase-modifying element may be suitable for changing the phase of the first electromagnetic radiation in each case in a plurality of subzones of the first beam. To this end, the first phase-modifying element may comprise a plurality of phase-modifying zones. In this way, downstream of the first phase-modifying element in the beam direction the first electromagnetic radiation may comprise different phases transversely of the beam direction of the first beam, in particular for example perpendicularly to the beam direction, in different zones of the beam cross-section of the first beam. In this case it may be advantageous for the first and second zones in each case to be such that modification of the phase of the first electromagnetic radiation is constant in the entire first zone and modification of the phase of the first electromagnetic radiation is constant in the entire second zone but different from the modification in the first zone, whereby a stepped phase profile may be produced over the beam cross-section of the first beam. The first electromagnetic radiation may thus comprise phase shifts or steps transversely of the beam direction of the first beam. It may here be particularly advantageous for a randomly distributed stepped phase profile to be produced, since such a phase profile may bring about a rapid change to the speckle pattern on a surface, which may, as described above, have an advantageous effect on suppression of speckle pattern perception through the averaging effect of the eye of an observer.

Alternatively or in addition, the first phase-modifying element may be constructed in such a way as to configure the first and second zones in each case such that the phase of the first electromagnetic radiation is modified continuously transversely of, in particular perpendicularly, to the first beam direction. In this way, a continuous phase profile may be produced. In particular, for example, a periodic, particularly preferably a sinusoidal phase profile may be produced. A phase-modifying element which is capable of producing a continuous phase profile may here be advantageous, since diffraction losses may thereby be minimised.

In a further embodiment the phase-modifying element is of disc- or plate-shaped construction, with two main directions of extension transversely of, in particular perpendicularly to, the beam direction of the first beam and may for example be polygonal, in particular rectangular or square, or moreover also circular, elliptical or a combination thereof. The two main directions of extension may be perpendicular to one another, for example. In the case of a circular or elliptical phase-modifying element, the one main direction of extension may be along a radius and the other main direction of extension may be along an angle of rotation. Different phase-modifying zones of the first phase-modifying element may be arranged along one main direction of extension, such that a plurality of different phase-modifying zones may adopt a striped pattern. In the case of a circular or elliptical phase-modifying element, a plurality of different phase-modifying zones may also adopt a sector-shaped or a circular or elliptical ring-shaped pattern. Alternatively or in addition, different phase-modifying zones may also be arranged in the second main direction of extension, such that a plurality of phase-modifying zones may for example be arranged in the manner of a matrix. The size of a phase-modifying zone, i.e. for example the width of a stripe, may preferably be greater than the wavelength of the first electromagnetic radiation. The phase profile may here advantageously have the same pattern as the arrangement of the phase-modifying zones, thus for example a striped or matrix-form pattern.

It may be particularly advantageous for the amplitude of the phase profile, i.e. the change to the phase brought about by the first phase-modifying element, to vary between a first and a second zone by at least 1.5 π, i.e. by at least 270°. In this case, the first and second zones do not have to adjoin one another. In particular, a stepped phase profile may exhibit random phase distribution. The first phase-modifying element may comprise a number of subzones which is greater than or equal to five and less than or equal to 15. Furthermore, a continuous periodic phase profile, for example a sinusoidal phase profile, may comprise a number of periods which is greater than or equal to one and less than or equal to 5, in the illuminated zone.

If the first beam is for example intended to be moved over a surface, it may be advantageous for the phase-modifying element to be arranged in the first beam in such a way that the phase profile of the first beam, if this falls onto the surface, changes parallel to the direction of movement of the first beam over the surface. With the phase-modifying zones arranged in stripes, the resultant phase profile of the first beam on the surface may exhibit stripes which preferably lie perpendicular to the direction of movement of the first beam. For example, the beam may also be moved over the surface in two directions of movement, the beam being moved more rapidly in one direction of movement than in the other direction of movement. It may here be advantageous for the above-stated to apply with regard to the direction of rapid movement.

The phase-modifying element may here advantageously be such that the amplitude and/or the intensity of the first electromagnetic radiation is not or is barely changed, such that no or only a slight loss of power is caused by the phase-modifying element. In particular, the first phase-modifying element may cover the entire first beam and at the same time preferably be transparent.

The first phase-modifying element may here comprise at least two zones with different optical path lengths for the first electromagnetic radiation, wherein the different path lengths may be caused by different thicknesses and/or different refractive indices. This may mean in particular that the first beam has to traverse two different optical path lengths in the at least two zones of the first phase-modifying element, such that the phase of the first electromagnetic radiation of the part of the first beam which is emitted by the first zone changes relative to the phase of the part of the first beam which is emitted by the second zone. Different thicknesses may be achieved for example by structuring at least one radiation entry face or one radiation exit face of the phase-modifying element. Different refractive indices may be achieved for example by the addition or use of different materials in addition to a support material. For example, the first phase-modifying element may comprise a transparent glass or transparent plastics or be made of such a material. In this instance, a change in refractive index may be brought about in subzones by ion exchange or implantation. Furthermore, the density of the material of the phase-modifying element may be different in different subzones.

Furthermore, the first phase-modifying element may take the form of a holographic image plate. In this case, the phase-modifying zones, i.e. for example a first and second zone, may comprise holographic structures which are suitable for modifying the phase of the first electromagnetic radiation in each case differently from one another.

In particular, the phase-modifying element may be transmissive or reflective, i.e. the phase-modifying element may modify the phase of the first electromagnetic radiation upon transmission of the first electromagnetic radiation through the phase-modifying element or upon reflection at a surface.

In a further embodiment the change in phase of the first electromagnetic radiation by the first phase-modifying element is variable over time. This may be achieved for example in that the first phase-modifying element is movable transversely of the beam direction of the first beam, i.e. not parallel to the beam path of the first electromagnetic radiation. For example, said movement may here be a periodic movement, particularly preferably in a direction perpendicular to the beam path of the first electromagnetic radiation. Furthermore, it may here be a linear movement or a rotation. Alternatively or in addition, the phase modification of the first electromagnetic radiation may be variable over time in at least one zone or in a plurality of zones of the first phase-modifying element. The movement may in this case be brought about for example by means of a motor or piezo element provided and/or suitable therefor. If the first phase-modifying element is moved relative to the first beam, continual modification of the speckle pattern may be produced, which, in addition for example to the modification of the speckle pattern for instance due to the movement of the first beam over a rough surface, may further reinforce the above-described effect of an observer's eye averaging the varying speckle pattern.

In one embodiment, the electromagnetic radiation emitted by the first radiation source is in particular electromagnetic radiation with a spectrum in the ultraviolet to infrared wavelength range. Furthermore, the spectrum may preferably be in the wavelength range of visible light. In particular, the spectrum may comprise at least one component with a wavelength of between approximately 400 nm and approximately 800 nm. Particularly preferably, the first electromagnetic radiation exhibits a blue, green or red wavelength and particularly preferably comprises monochromatic electromagnetic radiation.

In one embodiment the coherent first electromagnetic radiation has a large coherence length. This may mean in particular that the first electromagnetic radiation has a coherence length of the order of meters up to an order of a hundred meters or more.

Particularly preferably, the first electromagnetic radiation may be readily collimated, such that after collimation the first beam of coherent first electromagnetic radiation exhibits only slight divergence, such that the beam cross-section of the first beam is not at all or only slightly widened at a distance from the first radiation source. The distance of the first electromagnetic radiation may be of the order of meters.

Furthermore it is advantageous for the first radiation source to be suited to emitting first electromagnetic radiation at a high intensity. A high intensity may be achieved in this case by the first electromagnetic radiation being of high power and the beam cross-section being small. For example, the beam cross-section may comprise a diameter or a side length in the range of from one to a few micrometers, preferably approximately 5 micrometers.

In one preferred embodiment the first radiation source comprises a laser. The laser may for example comprise a laser diode, which may produce coherent first electromagnetic radiation of high beam quality with a compact structural size.

The laser diode may in this case comprise a sequence of semiconductor layers with an active zone which is suitable for emitting the first beam of coherent first electromagnetic radiation when in operation. The semiconductor layer sequence may in this case take the form of an epitaxial layer sequence or of a radiation-emitting semiconductor chip with an epitaxial layer sequence, i.e. take the form of an epitaxially grown semiconductor layer sequence. In this case, the semiconductor layer sequence may for example be based on InGaAlN. InGaAlN-based semiconductor chips and semiconductor layer sequences in particular include those in which the epitaxially produced semiconductor layer sequence generally comprises a layer sequence of different individual layers, including at least one individual layer which comprises a material from the III-V compound semiconductor material system $In_xAl_yGa_{1-x-y}N$ with $0 \leq x \leq 1$, $0 \leq y \leq 1$ and $x+y \leq 1$. Semiconductor layer sequences which comprise at least one active layer based on InGaAlN may for example preferably emit electromagnetic radiation with one or more spectral components in an ultraviolet to green wavelength range.

Alternatively or in addition, the semiconductor layer sequence or the semiconductor chip may also be based on InGaAlP, i.e. the semiconductor layer sequence may comprise different individual layers, of which at least one individual layer comprises a material from the III-V compound semiconductor material system $In_xAl_yGa_{1-x-y}P$ with $0 \leq x \leq 1$, $0 \leq y \leq 1$ and $x+y \leq 1$. Semiconductor layer sequences or semiconductor chips which comprise at least one active layer based on InGaAlP, may for example preferably emit electromagnetic radiation with one or more spectral components in a green to red wavelength range.

Alternatively or in addition, the semiconductor layer sequence or the semiconductor chip may also comprise other III-V compound semiconductor material systems, for example an AlGaAs-based material, or II-VI compound semiconductor material systems. In particular, an active layer comprising an AlGaAs-based material may be suitable for emitting electromagnetic radiation with one or more spectral components in a red to infrared wavelength range.

In a further embodiment the first radiation source comprises a radiation exit face, via which the coherent first electromagnetic radiation produced in operation may be emitted. In the case in particular of a laser diode comprising a semiconductor layer sequence or a semiconductor chip, the semiconductor layer sequence or the semiconductor chip may comprise the radiation exit face. For example, the semiconductor layer sequence or the semiconductor chip may be an edge-emitting laser diode. This may mean in particular that the radiation exit face is formed by a side face of the semiconductor layer sequence or of the semiconductor chip. Furthermore, the radiation exit face may for example also comprise a plurality of side faces. Alternatively, the semiconductor layer sequence or the semiconductor chip may also be a vertically emitting laser diode ("VCSEL"), such that the radiation exit face may be formed by a major surface of the semiconductor layer sequence or of the semiconductor chip. Furthermore, the first radiation source may comprise a plurality of semiconductor layer sequences or semiconductor chips or a semiconductor layer sequence or a semiconductor chip with a plurality of active zones. In this way it may be possible, for example, for electromagnetic radiation to be produced in a first active zone, which electromagnetic radiation may then produce the first electromagnetic radiation in a second active zone for example by optical pumping. Furthermore, the first radiation source may also comprise elements for example for frequency mixing or in particular for frequency doubling.

In a preferred embodiment the first radiation source does not comprise a collimating optical system. This may in particular mean that the first electromagnetic radiation emitted by the first radiation source constitutes a beam which is divergent, i.e. not collimated. In particular, the first beam emitted by the first radiation source may exhibit a divergence angle which is greater than or equal to five degrees and less than or equal to 20 degrees. In particular, on exit from the first radiation source the first beam may exhibit a beam cross-section which amounts to a few square micrometers. For example, the first beam cross-section may be substantially rectangular in shape with edge lengths in the range from one to a few micrometers, for example three to five micrometers.

In a particularly preferred embodiment the first phase-modifying element is arranged immediately downstream of the first radiation source in the beam path of the first electromagnetic radiation. This may mean in particular that no focusing or collimating optical system is arranged between the first radiation source and the first phase-modifying element. This may mean that the first beam impinges on the first phase-modifying element as a divergent beam, i.e. as a non-collimated beam.

In a further preferred embodiment the device additionally comprises a first optical element, the first optical element being arranged downstream of the first phase-modifying element in the beam path of the first electromagnetic radiation. The first optical element may in particular be suitable for collimating and/or focusing the first beam, and thus for example comprise a collimating or focusing optical system. In this case, after passage through the first optical element the first beam may for example have a smaller or no divergence angle and/or a smaller beam cross-section. A "smaller divergence angle" and a "smaller beam cross-section" may here mean in particular that the divergence angle or the beam cross-section of the first beam is smaller downstream of the first optical element in the beam direction of the first beam than upstream of the first optical element. The first optical element may in this case be arranged at a distance greater than or equal to 0.5 millimeters and less than or equal to five millimeters from the first radiation source. Preferably, the first optical element may be at a distance greater than or equal to one millimeter and less than or equal to five millimeters from the first radiation source, preferably less than or equal to 2 millimeters. The first optical element may for example comprise one or more lenses or a lens system which is suitable for collimating and/or focusing the divergent beam emitted by the first radiation source. The first optical element may in this case comprise for example an anamorphically shaped lens as the collimating optical system or part of a collimating optical system.

As described further above, the phase-modifying element may be suitable for producing a "rough" phase front of the first electromagnetic radiation, the first beam possibly being divergent. By arranging the first optical element downstream of the first phase-modifying element in the beam path of the first beam, a plane wave with a "rough" phase front may be produced, for example by collimating the first beam in the conjugate plane, i.e. at infinity or on a surface.

By arranging the first phase-modifying element between the first radiation source and the first optical element, it is advantageously possible to achieve a compact and simply constructed device, since the optoelectronic device does not have to comprise any additional space for a phase-modifying element arranged downstream of the optical element in the beam path of the first electromagnetic radiation.

In a further embodiment the first phase-modifying element is at a distance from the first radiation source which is less than or equal to half the distance between the first optical element and the first radiation source. Particularly preferably, the distance of the phase-modifying element from the first radiation source is greater than or equal to 10% and less than or equal to 20% of the distance of the first optical element therefrom. In this way, a compact first phase-modifying element may advantageously be used, which is still sufficiently large for possible diffraction effects to be negligible or acceptable.

In a further preferred embodiment the radiation-directing element is suitable for directing the first beam over the surface. This means that the radiation-directing element may be set up to direct the first beam over the surface. "Directing over the surface" may here mean for example that the first beam impinges on different subzones of the surface at different times. In this respect, the radiation-directing element may be set up so as to allow and bring about continuous or stepwise modification of the beam direction of the first beam over a time or a period of time. The radiation-directing element may here comprise at least one directable mirror. Such a mirror, which may also be known as a "scanner mirror", may for example be directable in one or in two dimensions. For example, the mirror may be rotatable in each case by a certain angular amount about two mutually perpendicular axes. Furthermore, the mirror may be displaced continuously or stepwise and/or periodically in one or more spatial directions, for example in two non-parallel spatial directions.

Furthermore, the radiation-directing element may be suitable and/or set up to allow the first beam periodically to sweep a fixed solid angle zone. In particular, the fixed solid angle zone may be a solid angle zone with a square or rectangular cross-section. This may mean in particular that the first beam may be directed over a quadrilateral, particularly preferably over a square or rectangular zone of the surface. Alternatively or in addition, the fixed solid angle zone may also have a round, elliptical or other-shaped cross-section, which may in particular be a combination of the previously stated shapes. The solid angle zone may then preferably be swept in linear manner in successive lines.

By means of the scanner mirror, the first beam may be directed onto a surface, for instance a wall, a screen, a fluorescent screen or the like and the first electromagnetic radiation may thereby be projected onto the surface. In particular, subzones of the surface, which are illuminated at different times by the first beam, may be understood as pixels of an alphanumeric or graphic display, such that, with continuous illumination of the surface, information may be displayed on the surface by scanning a defined area of the surface in lines and columns while simultaneously varying the intensity of the first electromagnetic radiation. The optoelectronic device may thus be a projector device which uses the "flying-spot" method for projecting information.

In a particularly preferred embodiment, the optoelectronic device forms at least part of a projector, in particular of a laser projector. Furthermore, the optoelectronic device may be such a projector.

In a further embodiment the device additionally comprises a second radiation source, which is suitable for emitting a second beam of coherent second electromagnetic radiation when in operation.

Moreover, the device may comprise a second phase-modifying element which is arranged in the beam path of the second electromagnetic radiation and is suitable or set up to change the phase of the second electromagnetic radiation in a subzone of the second beam. Alternatively, the device may in fact not comprise a second phase-modifying element. This may mean that a first phase-modifying element is arranged immediately downstream of just the first radiation source.

Furthermore, the device may comprise an optical combiner for superposition of the first beam on the second beam to yield a combined first and second beam. The optical combiner may here take the form for instance of a dichroic mirror or dichroic prism, which is suitable for example for reflecting the first beam and transmitting the second beam or vice versa.

In particular, the second radiation source may comprise features which were described above in relation to the first radiation source. Likewise, the second phase-modifying element may comprise features as described above in connection with the first phase-modifying element.

Particularly preferably, the combined first and second beam falls onto the radiation-directing element, such that just one beam, which comprises the first and second electromagnetic radiation, is radiated onto the surface, which beam may however be varied in its colour appearance by varying the intensity in each case of the first and second electromagnetic radiation.

Particularly preferably, the first electromagnetic radiation and the second electromagnetic radiation may differ from one another.

In a further preferred embodiment the device additionally comprises a third radiation source, which is suitable or set up to emit a third beam of coherent third electromagnetic radiation when in operation.

Furthermore, the device may comprise a third phase-modifying element in the beam path of the third electromagnetic radiation for modifying the phase of the third electromagnetic radiation in a subzone of the third beam. Alternatively, the device may in fact not comprise a third phase-modifying element. This may mean that a first phase-modifying element is arranged downstream of just the first radiation source. Alternatively, this may mean that there are only a first phase-modifying element arranged downstream of the first radiation source and a second phase-modifying element arranged downstream of the second radiation source.

Furthermore, the device may comprise an optical combiner, for instance a dichroic mirror or a dichroic prism, for superposition of the first and/or the second beam on the third beam.

The third radiation source or the third phase-modifying element may comprise features as described above in connection with the first radiation source or the first phase-modifying element. In particular, the radiation-directing element may be arranged downstream of the optical combiner in the beam path of the first and/or the second and/or the third radiation.

Particularly preferably, the first, second and third electromagnetic radiation may differ from one another. In this respect, a second optical element may be arranged downstream of the second phase-modifying element and/or the second radiation source, which second optical element comprises features as described above in connection with the first optical element. Furthermore, a third optical element may be arranged downstream of the third phase-modifying element and/or the third radiation source, which third optical element comprises features as described above in connection with the first optical element.

The first, second and third electromagnetic radiation may particularly preferably have red, green and blue wavelengths, such that the beam directed onto the surface, which is a superposition of the first, second and third beams, may produce an appearance of mixed-coloured light. By changing relative to one another the intensities of the first, second and third electromagnetic radiation, the appearance of variable light may thus be produced. The optoelectronic device may thus for example take the form of an RGB projector.

DETAILED DESCRIPTION OF THE DRAWINGS

Figure 1:
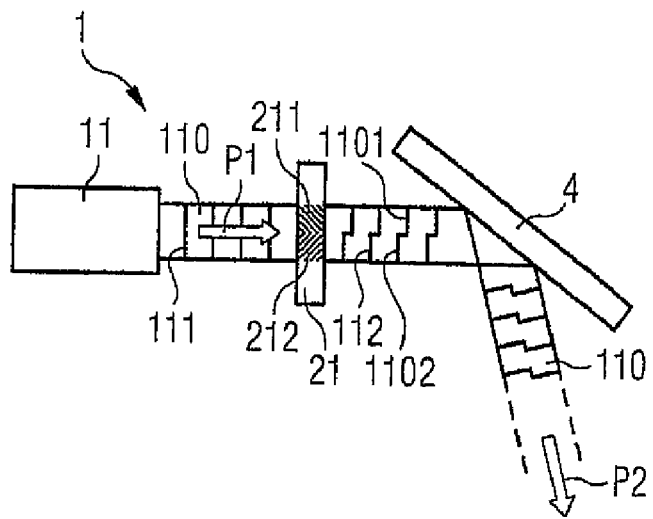
FIG. 1 shows a schematic embodiment of an optoelectronic device having a first radiation source according to one exemplary embodiment.

In the exemplary embodiments and figures, identical or identically acting constituents may in each case be provided with the same reference numerals. The elements illustrated and their mutual size ratios should not in principle be regarded as being to scale, but rather individual elements, such as for example layers, components, structural elements, as well as surfaces and zones thereof, may have been made exaggeratedly thick or large to illustrate them better and/or to make them easier to understand.

FIG. 1 shows an exemplary embodiment of an optoelectronic device 1 with a first radiation source 11. The first radiation source 1 is suitable for emitting a first beam 110 of coherent first electromagnetic radiation when in operation. The coherent first electromagnetic radiation here has a smooth phase front 111, the beam path of the first electromagnetic radiation extending in the direction labelled P1. Preferably, in the exemplary embodiment illustrated the radiation source 11 may be a laser, which may emit a first beam of first electromagnetic radiation with a large coherence length.

In the beam path of the first beam 110 of the first electromagnetic radiation, a first phase-modifying element 21 is arranged downstream of the radiation source 11, which element comprises a first and a second phase-modifying zone 211, 212 within the beam cross-section of the first beam 110, which zones each have a different optical path length for the first electromagnetic radiation. In particular, in the exemplary embodiment shown, the first zone 211 of the first phase-modifying element 21 has a smaller optical path length than the second zone 212. In this way, after traversing the first phase-modifying element 21 the first beam 110 comprises a phase front 112 with two subzones 1101 and 1102, the phase in the subzone 1102 being shifted relative to the phase in the subzone 1101 and in particular the phase in the first subzone 1101 leads the phase in the second subzone 1102. The first phase-modifying element 21 thus makes it possible to achieve a rough phase front 112 with a stepped profile. Alternatively or in addition, the first phase-modifying element 21 may comprise holographic structures, which may alternatively or additionally bring about a phase difference between the phases of the subzones 1101 and 1102.

In particular, the device 1 does not comprise any further element, in particular no further optical element, between the first radiation source 11 and the first phase-modifying element 21, such that the first phase-modifying element 21 is arranged immediately downstream of the first radiation source 11 in the beam path.

Arranged downstream of the first phase-modifying element 21 in the beam path in the direction P1 of the first electromagnetic radiation is a radiation-directing element 4, which changes the beam direction in the direction P1 into a beam direction in the direction P2. In particular, the radiation-directing element 4 is suitable for varying the direction P2.

Figure 2:
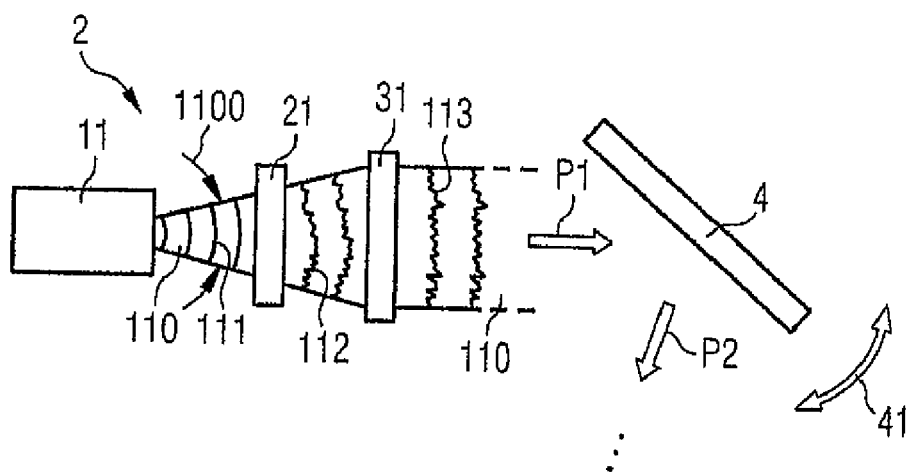
FIGS. 2 and 3 show schematic embodiments of optoelectronic devices having a first radiation source according to further exemplary embodiments.
Figure 2:
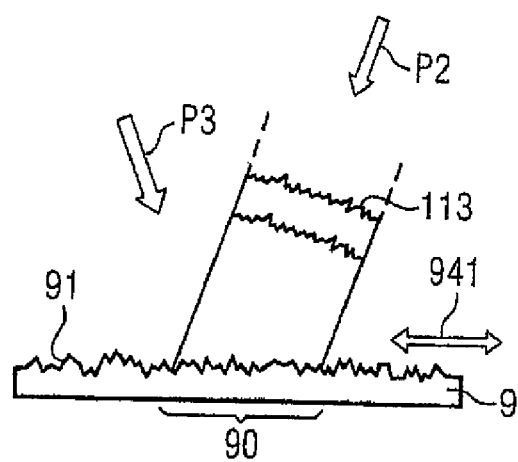

FIG. 2 shows a further exemplary embodiment of an optoelectronic device 2 with a first radiation source 11, which takes the form of a laser diode. The laser diode may in this case comprise features according to at least one embodiment described above. In particular, the laser diode comprises a semiconductor chip and takes the form of an edge-emitting or vertically emitting semiconductor chip. When in operation, the laser diode emits a first beam 110 of coherent first electromagnetic radiation with a smooth phase front 111 in a beam path extending in the direction P1. The radiation source 11 does not comprise any collimating or focusing optical system but rather emits a first beam 110 of divergent coherent first electromagnetic radiation with an approximately rectangular beam cross-section with initial edge lengths of approximately 3 and approximately 5 micrometers and a curved, smooth phase front. The first beam 110 typically comprises a divergence angle 1100 of approximately 5 to approximately 20 degrees. These values should be understood as being given purely by way of example and depend on the type of first radiation source 1 used.

The divergent first beam 110 traverses a phase-modifying element 21 with a plurality of phase-modifying zones, such that, after transmission through the first phase-modifying element 21, the first beam comprises coherent first electromagnetic radiation with a curved, rough phase front 112.

At a distance of approximately 1 to 2 mm from the radiation source 11, there is arranged in the beam path of the first beam 110, downstream of the first phase-modifying element 21, a first optical element 31, which is set up as an anamorphic lens for collimation and beam shaping. In this way, after traversing the first optical element 31 the first beam 110 has a substantially round beam cross-section and a flat rough phase front 113, In particular, the first beam 110 is collimated by the first optical element 31 and exhibits only slight divergence. The distance of the first phase-modifying element from the first radiation source is as described above in relation to the distance between the first optical element and the first radiation source.

The beam direction is changed to the direction labelled P2 by the radiation-directing element 4, which takes the form of a movable, for example rotatable, scanner mirror. The scanner mirror 4 is here rotatable about an axis perpendicular to the image plane, as indicated by the double-headed arrow 41. Furthermore, the scanner mirror 4 is also movable, for example rotatable, about an axis perpendicular thereto, but this is not shown for reasons of clarity. In this way, the direction P2 is continuously variable within a solid angle zone predetermined by the angle of the scanner mirror 4.

By means of the scanner mirror 4, the first beam 110 is directed onto a surface 91, for example a preferably flat device 9, for instance a wall, a screen, a fluorescent screen or the like, which may thus be illuminated by the optoelectronic device 2 in subzones 90 or the first beam 110 may be projected onto the surface in these subzones 90. In particular, the subzones 90 may be understood as pixels of an alphanumeric or graphic display, such that, with continuous illumination of the surface 91, information may be displayed on the surface 91 by scanning a defined area of the surface 91 in lines and columns, as indicated by the double-headed arrow 41, while simultaneously varying the intensity of the first electromagnetic radiation. The optoelectronic device 2 is thus a projector device according to the exemplary embodiment illustrated.

An observer looking at the surface for instance from the direction P3 may perceive the information thus displayed. At any point in time, the observer here perceives an interference image of the first electromagnetic radiation reflected by the surface 91 opposite to the direction P3, this being produced by the roughness of the surface 91 and the rough phase front 113 of the first beam 110. The interference image or the speckle pattern, which the observer may perceive, results from scattering and diffraction of the first beam 110 at the topological roughness structures of the surface 91. Since, during movement of the first beam 110 over the surface 91, for instance in the direction 941, the position of the rough phase front 113 changes continually relative to the topological roughness structures, the interference image also changes and thus the impression of the speckle pattern on an observer. The persistence of the observer's vision means that he/she will thus merely perceive a time-averaged speckle pattern, which means that the impression of the speckle pattern is weakened significantly or is even no longer perceivable at all due to the random nature of the interference image.

To reinforce this effect, the phase-modifying element 21 may for example additionally be moved in a direction which is not parallel to the beam direction in direction P1, such that the rough phase front 113 is modified in a manner which varies over time.

Figure 3:
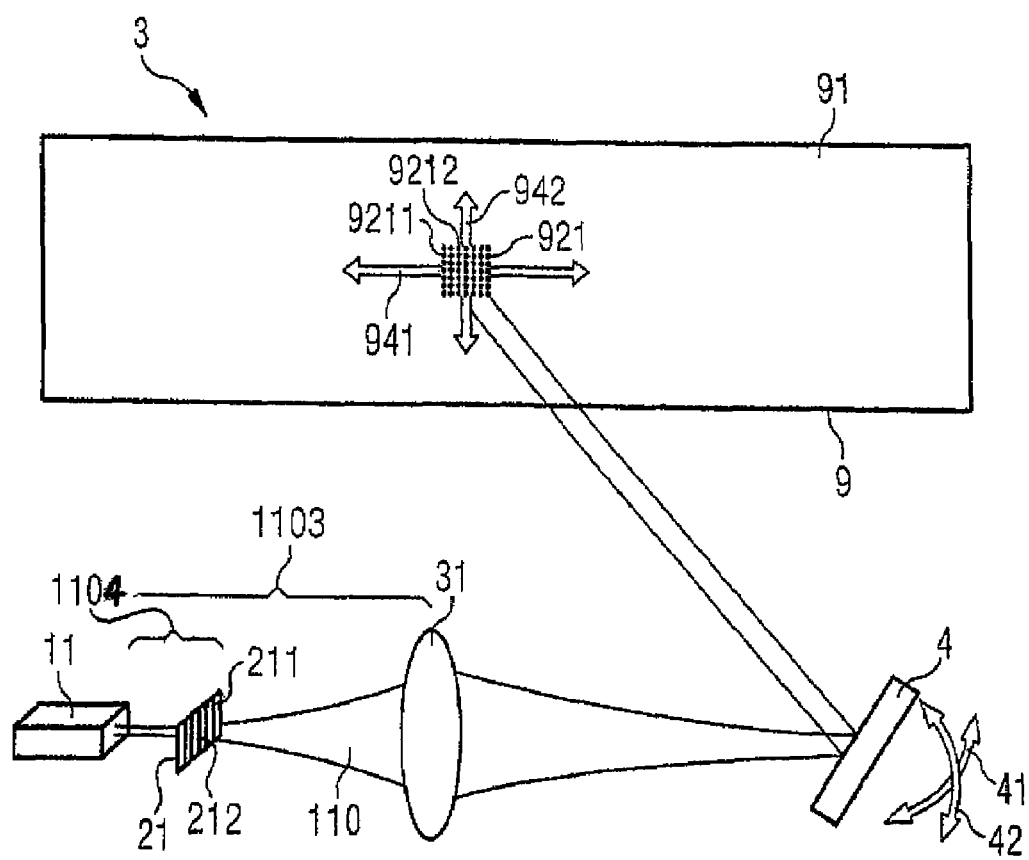

FIG. 3 is a perspective, schematic representation of a further exemplary embodiment of an optoelectronic device 3. The optoelectronic device 3 here comprises features like those in the previous exemplary embodiment of the optoelectronic device 2, such that only additional features will be examined below. The first beam comprises a Gaussian beam profile and is collimated by the optical element 31, in the exemplary embodiment shown a collimator lens. In this instance, the optical element 31 is spaced from the first radiation source 11 by a distance 1103.

By means of the mirror 4, which is movable in the two mutually orthogonal directions 41 and 42, the first beam 110 may be directed onto the surface 91 and moved over the surface 91 in lines and columns in the two directions 941 and 942. Movement in direction 941 proceeds more rapidly than movement in direction 942, whereby the beam 110 may scan the surface 91 in successive lines. In particular, movement in the direction 942 may proceed stepwise.

Furthermore, the optoelectronic device 3 comprises a phase-modifying element 21, which is at a distance 1102 from the radiation source 11 as described above in relation to the distance 1103. The phase-modifying element 21 comprises a plurality of phase-modifying zones arranged in stripes, of which a first zone 211 and a second zone 212 are indicated, purely by way of example. The phase-modifying element 21 is here suitable for producing a striped and stepped phase profile of the first electromagnetic radiation, and is oriented in such a way in the first beam 110 that the stripes 9211, 9212 lie, with the same phase, perpendicularly to the direction of rapid movement 941. In this way, the effect described in relation to FIG. 2 of a time-averaged speckle pattern may advantageously be favoured. To reinforce this effect, the phase-modifying element 21 may additionally be moved to-and-fro in a direction perpendicular to the stripes 9211, 9212.

Figure 4:
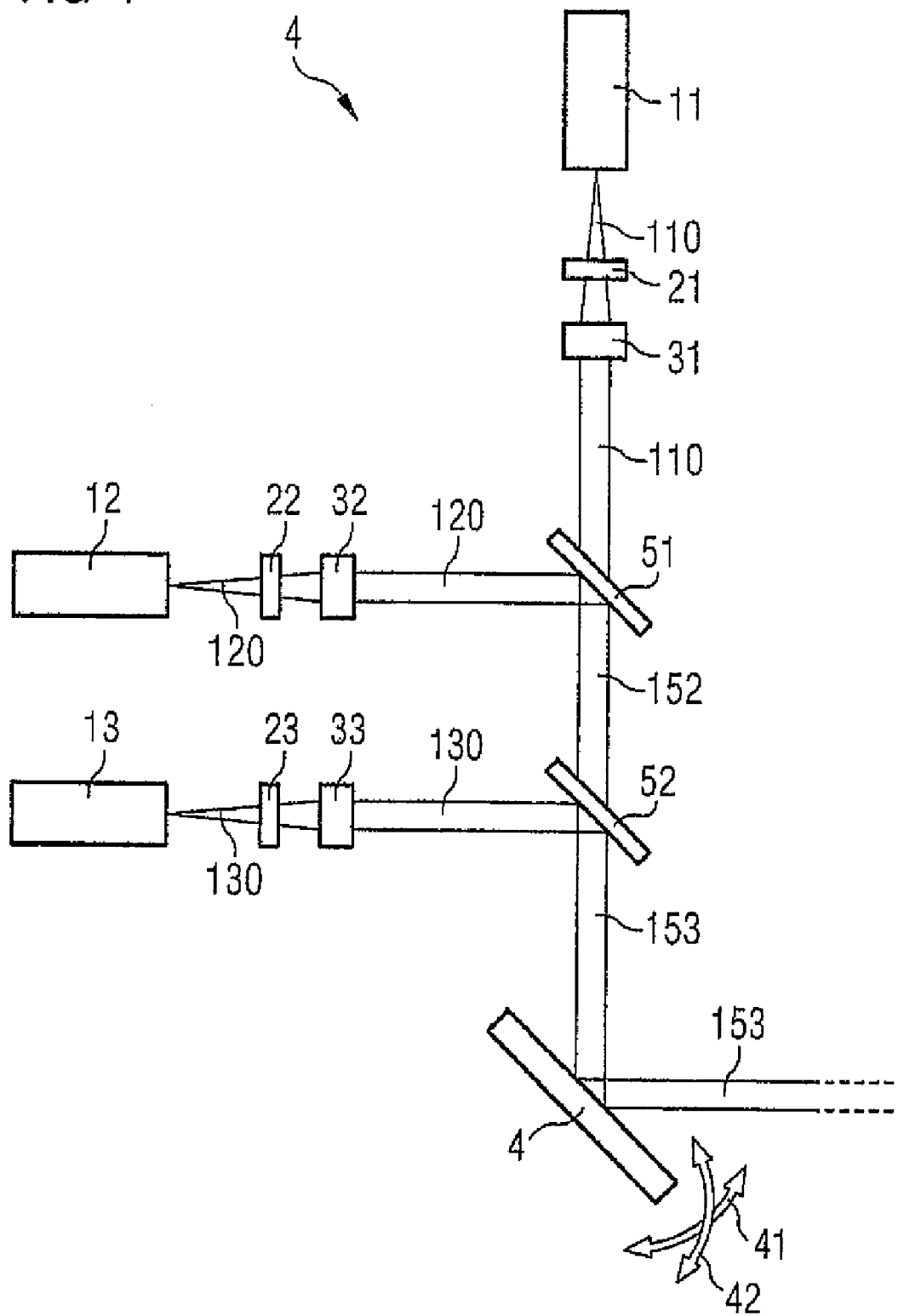
FIG. 4 shows a schematic embodiment of an optoelectronic device having a first, second and third radiation source according to a further exemplary embodiment.

FIG. 4 shows an exemplary embodiment of an optoelectronic device 4 which enables projection of full-colour information onto a surface (not shown) in accordance with the preceding exemplary embodiments. To this end, the optoelectronic device 3 comprises a first radiation source 11, a second radiation source 12 and a third radiation source 13, of which in each case for example the first emits red, the second green and the third blue, monochromatic, coherent electromagnetic radiation. How the respective wavelengths are assigned to the respective radiation sources is stated purely by way of example. As in the previous exemplary embodiment, a first, a second and a third phase-modifying element 21, 22, 23 together with a first, a second and a third optical element 31, 32, 33 are in each case arranged downstream of the radiation sources 11, 12, 13.

The first beam 110 emitted by the first radiation source 11 and the second beam 120 emitted by the second radiation source 12 are superposed by the optical combiner 51 to yield a beam 152 which encompasses the first and second electromagnetic radiation, namely the first beam 110 and the second beam 120. The optical combiner 51 takes the form of a dichroic mirror, which transmits the first electromagnetic radiation and reflects the second electromagnetic radiation. The beam 152 is additionally superposed by means of a further optical combiner 52 on the third beam 130, which is emitted by the third radiation source 13, to yield a beam 153, which thus encompasses the first, second and third electromagnetic radiation. The optical combiner 52 is likewise a dichroic mirror, which transmits the first and second electromagnetic radiation and reflects the third electromagnetic radiation. Alternatively, the optical combiners 51 and 52 may be embodied as a one-piece component.

As in the preceding exemplary embodiment, the beam 153, which encompasses the first, second and third beams 110, 120, 130, is directed onto a surface (not shown) by means of the radiation-directing element 4, for instance a scanner mirror. Through periodic variation of the scanner mirror position and the relative intensities of the first, second and third electromagnetic radiation, information may thus be projected onto the surface in full colour.

Figure 5A:
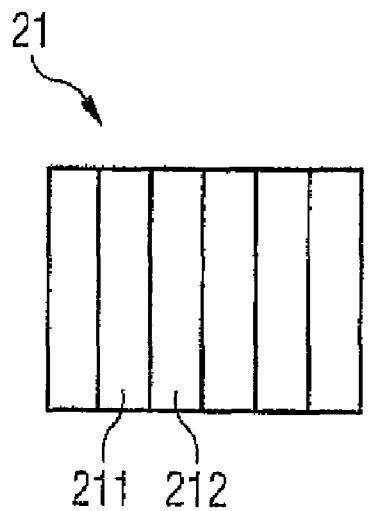
FIGS. 5A to 5D show schematic embodiments of phase-modifying elements according to further exemplary embodiments.
Figure 5B:
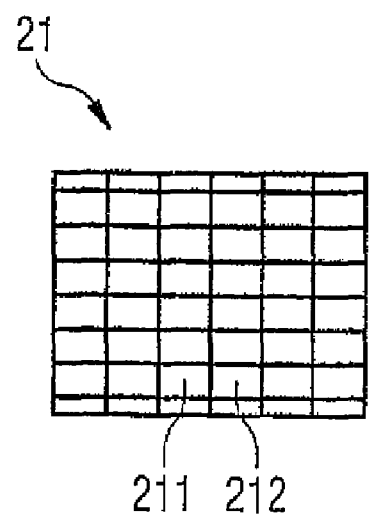
Figure 5C:
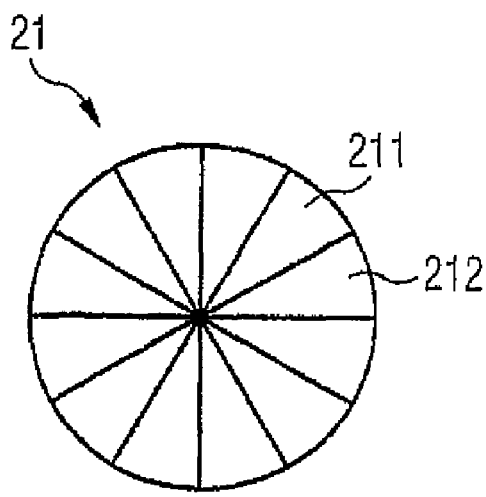
Figure 5D:
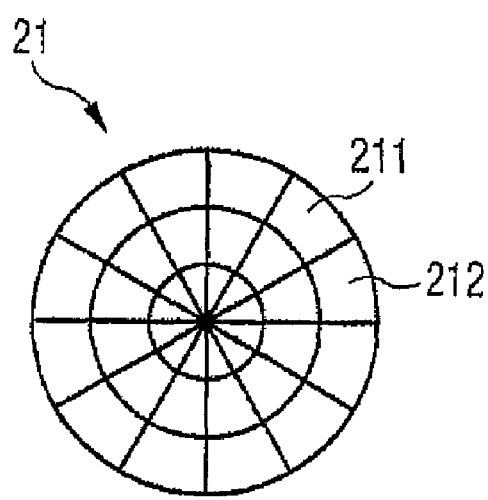

FIGS. 5A and 5B show exemplary embodiments of rectangular phase-modifying elements 21, which exhibit a plurality of phase-modifying zones arranged as stripes or a matrix. For the sake of clarity, only a first zone 211 and a second zone 212 are here indicated. The phase-modifying elements 21 of the exemplary embodiments shown in FIGS. 5C and 5D are circular in shape. FIG. 5C shows a sector-type arrangement of the phase-modifying zones and FIG. 5D shows a corresponding matrix-type arrangement. Instead of discrete phase-modifying zones, which are capable of producing a stepped phase profile, the zones may also merge continuously with one another, such that a continuous phase profile may be produced. The rectangular and circular shapes shown in FIGS. 5A to 5D are merely examples.

Figure 6A:
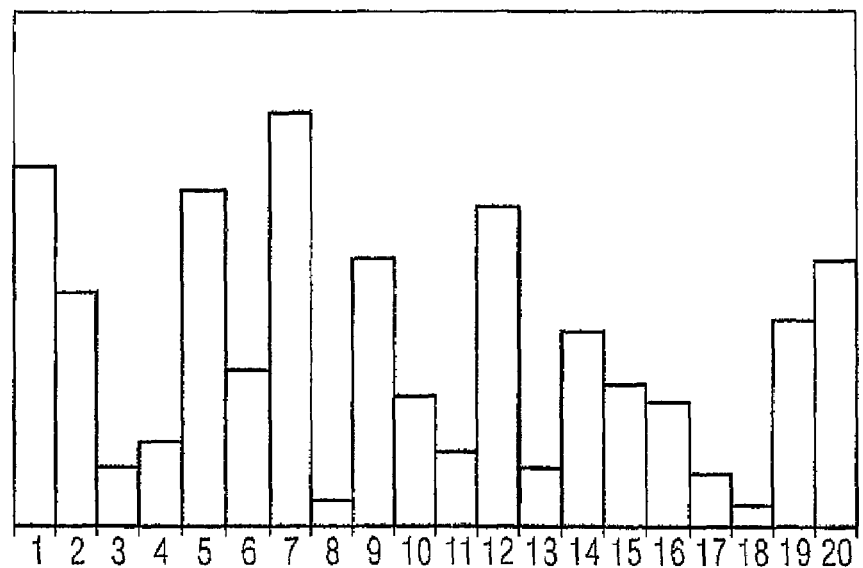
FIGS. 6A and 6B show graphs with the phase profiles which may be produced by phase-modifying elements.

FIG. 6A shows by way of example the graph 601, which represents a randomly distributed, stepped phase profile. The x-axis here denotes the distribution of the steps over the beam cross-section and the y-axis denotes the phase deviation, i.e. the relative phase modification brought about by a plurality of 20 phase-modifying zones of a phase-modifying element 21. The maximum phase deviation amplitude ("amplitude"), i.e. the maximum difference in phase deviation, is here greater than 270°. Theoretical observations and calculations show that, with a phase-modifying element 21 which is capable of producing a phase profile according to FIG. 6A, speckle contrast may be reduced virtually by the factor 5.

Figure 6B:
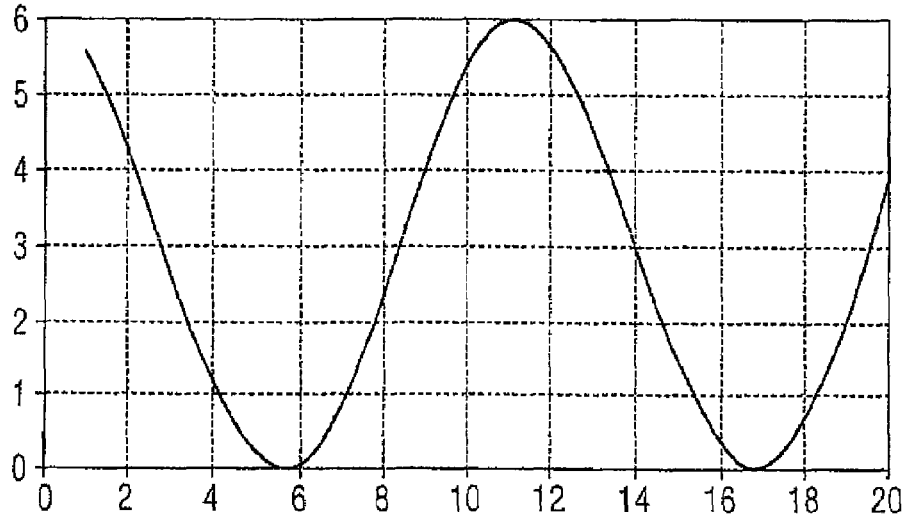

In the graph 602, FIG. 6B shows a continuous sinusoidal phase profile with approximately 1.8 periods and an amplitude of approx $2\pi$. Theoretical observations and calculations show that in this way speckle contrast may be reduced by virtually the factor 3, while this reduction may be further increased for example by moving a corresponding phase-modifying element 21 in the beam of electromagnetic radiation.

Figure 7:
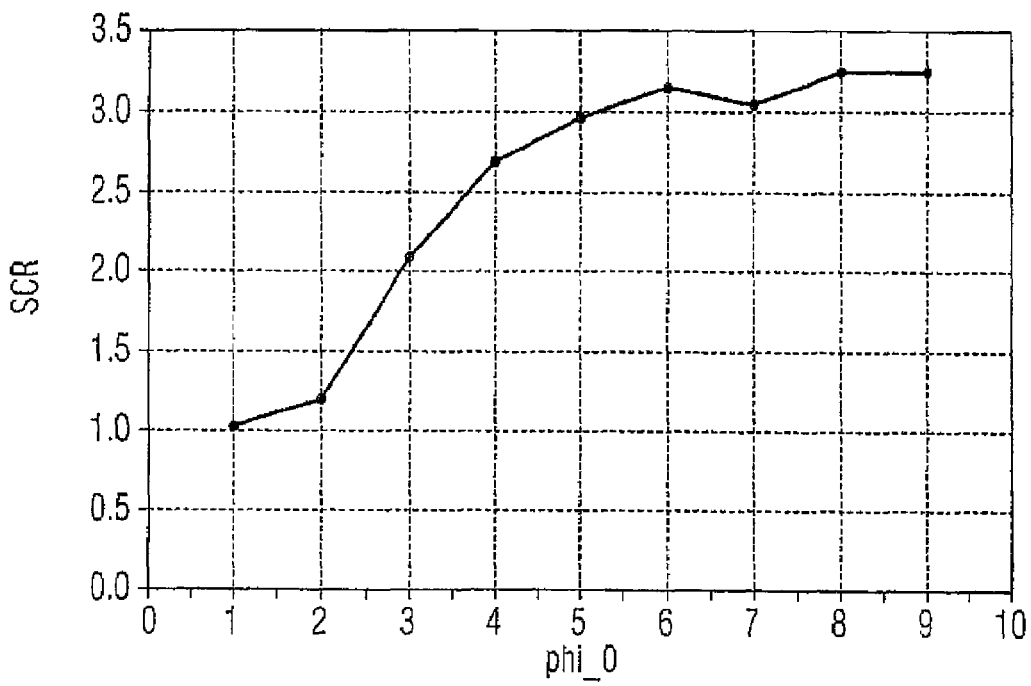
FIGS. 7 and 8 show graphs relating to the dependency of the speckle pattern contrast on the number of phase-modifying zones of a stepped phase profile and on the maximum amplitude of a phase profile.

In the graph 701 FIG. 7 shows the speckle contrast reduction brought about by a phase-modifying element 21 as a function of the maximum phase deviation amplitude. The maximum phase deviation amplitude is here plotted on the x-axis (in rad) and the resultant speckle contrast reduction (SCR) is plotted on the y-axis. It is clear that a maximum phase deviation amplitude of at least $1.5\pi$ is advantageous.

Figure 8:
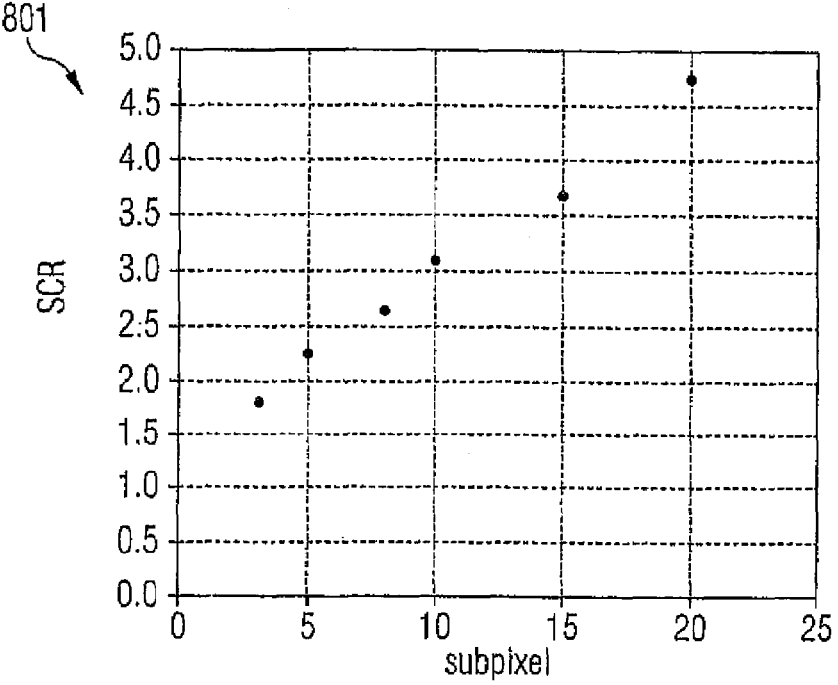

In the graph 801, FIG. 8 shows, for a maximum phase deviation amplitude of more than $1.5\pi$, how the speckle contrast reduction on the y-axis is dependent on the number plotted on the x-axis of phase-modifying zones of a phase-modifying element, the phase-modifying element being capable of producing a randomly distributed stepped phase profile such as for instance the one shown in FIG. 6A.

According to the described embodiments and exemplary embodiments, a projection device may be obtained which is of a compact, space-saving and inexpensive construction and has a good display characteristic with regard to a speckle pattern impression, which is greatly reduced or not perceivable at all. The description made with reference to exemplary embodiments does not here restrict the invention to these embodiments. Rather, the invention encompasses any novel feature and any combination of features, including in particular any combination of features in the claims, even if this feature or this combination is not itself explicitly indicated in the claims or exemplary embodiments.

The invention claimed is:

1. An optoelectronic device for projecting a first beam of coherent first electromagnetic radiation onto a surface and a second beam of coherent second electromagnetic radiation onto the surface, comprising:
   a first radiation source adapted for emitting the first beam of coherent first electromagnetic radiation;
   a first phase-modifying element in a beam path of the first electromagnetic radiation for modifying a phase of the first electromagnetic radiation in a subzone of the first beam;
   a radiation-directing element in the beam path of the first electromagnetic radiation for changing a beam direction of the first beam;
   a second radiation source adapted to emit a second beam of coherent second electromagnetic radiation;
   an optical combiner adapted to superimpose the first beam on the second beam; and
   a second phase-modifying element in the beam path of the second electromagnetic radiation for changing a phase of the second electromagnetic radiation in a subzone of the second beam.

2. The optoelectronic device according to claim 1, wherein the first radiation source comprises a laser.

3. The optoelectronic device according to claim 1, wherein the laser comprises a laser diode.

4. The optoelectronic device according to claim 1, wherein the first beam emitted by the first radiation source is divergent.

5. The optoelectronic device according to claim 1, wherein the first beam emitted by the first radiation source exhibits a divergence angle which is greater than or equal to 5 degrees and less than or equal to 20 degrees.

6. The optoelectronic device according to claim 1, wherein the first phase-modifying element is arranged immediately downstream of the first radiation source in the beam path of the first electromagnetic radiation.

7. The optoelectronic device according to claim 1, wherein the device additionally comprises a first optical element, and the first optical element is arranged downstream of the first phase-modifying element in the beam path of the first electromagnetic radiation.

8. The optoelectronic device according to claim 7, wherein the first optical element is adapted to at least one of collimate and focus the first beam.

9. The optoelectronic device according to claim 7, wherein the first optical element is at a distance greater than or equal to 0.5 mm and less than or equal to 5 mm from the first radiation source.

10. The optoelectronic device according to claim 7, wherein the first phase-modifying element is at a distance from the first radiation source which amounts to less than half the distance between the first optical element and the first radiation source.

11. The optoelectronic device according to claim 1, wherein the first phase-modifying element comprises at least a first zone and a second zone, which are configured to respectively modify the phase of the first electromagnetic radiation to a different degree.

12. The optoelectronic device according to claim 11, wherein the first and second zones are such that modification of the phase of the first electromagnetic radiation is constant in an entirety of the first zone and modification of the phase of the first electromagnetic radiation is constant in an entirety of the second zone.

13. The optoelectronic device according to claim 11, wherein the first and second zones are such that the phase of the first electromagnetic radiation is modified continuously transversely of the first beam direction.

14. The optoelectronic device according to claim 11, wherein the first and second zones comprise optical path lengths for the first electromagnetic radiation which differ from one another at least in part.

15. The optoelectronic device according to claim 11, wherein the first and second zones comprise holographic structures which differ from one another at least in part.

16. The optoelectronic device according to claim 1, wherein a change in phase of the first electromagnetic radiation brought about by the first phase-modifying element is variable over time.

17. The optoelectronic device according to claim 16, wherein the first phase-modifying element is configured to be moved transversely of the beam path of the first electromagnetic radiation.

18. The optoelectronic device according to claim 1, wherein the radiation-directing element is configured to direct the first beam over the surface.

19. The optoelectronic device according to claim 1, wherein the radiation-directing element comprises at least one directable mirror.

20. The optoelectronic device according to claim 1, wherein the radiation-directing element is configured to cause the first beam to sweep a fixed solid angle zone periodically.

21. The optoelectronic device according to claim 1, for the additional projection of a third beam of coherent third electromagnetic radiation onto the surface, further comprising:
 a third radiation source adapted for emitting a third beam of coherent third electromagnetic radiation; and
 an optical combiner configured to superimpose at least one of the first and the second beam on the third beam.

22. The optoelectronic device according to claim 21, further comprising a third phase-modifying element in the beam path of the third electromagnetic radiation for changing a phase of the third electromagnetic radiation in a subzone of the third beam.

23. An optoelectronic device for projecting a first beam of coherent first electromagnetic radiation onto a surface, a second beam of coherent second electromagnetic radiation onto the surface, and a third beam of coherent third electromagnetic radiation onto the surface, comprising:
 a first radiation source adapted to emit the first beam of coherent first electromagnetic radiation;
 a first phase-modifying element in a beam path of the first electromagnetic radiation for modifying a phase of the first electromagnetic radiation in a subzone of the first beam;
 a radiation-directing element in the beam path of the first electromagnetic radiation for changing a beam direction of the first beam;
 a second radiation source adapted to emit the second beam of coherent second electromagnetic radiation;
 an optical combiner adapted to superimpose the first beam on the second beam;
 a third radiation source adapted to emit the third beam of coherent third electromagnetic radiation;
 an optical combiner adapted to superimpose at least one of the first beam and the second beam on the third beam; and
 a third phase-modifying element in the beam path of the third electromagnetic radiation for changing the phase of the third electromagnetic radiation in a subzone of the third beam.

* * * * *